United States Patent
Doster et al.

(10) Patent No.: US 9,384,044 B2
(45) Date of Patent: *Jul. 5, 2016

(54) INTELLIGENT INCLUSION/EXCLUSION AUTOMATION

(75) Inventors: Bard A. Doster, Tucson, AZ (US);
Dustin A. Helak, Tucson, AZ (US);
David C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 413 days.

This patent is subject to a terminal disclaimer.

(21) Appl. No.: 13/342,685

(22) Filed: Jan. 3, 2012

(65) Prior Publication Data
US 2013/0174167 A1    Jul. 4, 2013

(51) Int. Cl.
*G06F 9/46* (2006.01)
*G06F 9/455* (2006.01)
*G06F 9/48* (2006.01)
*G06Q 10/06* (2012.01)
*G06F 9/52* (2006.01)

(52) U.S. Cl.
CPC .............. *G06F 9/4881* (2013.01); *G06Q 10/06* (2013.01); *G06F 9/455* (2013.01); *G06F 9/52* (2013.01)

(58) Field of Classification Search
CPC .............. G06F 9/52; G06F 9/45; G06F 9/455
USPC .................................................. 718/102, 104
See application file for complete search history.

(56) References Cited

U.S. PATENT DOCUMENTS

| 5,877,759 | A | 3/1999 | Bauer |
| 6,721,870 | B1* | 4/2004 | Yochai .................. G06F 3/0611 711/112 |
| 6,799,169 | B1* | 9/2004 | Coffman et al. ................. 706/11 |
| 8,239,584 | B1* | 8/2012 | Rabe et al. ......................... 710/8 |
| 2005/0204095 | A1* | 9/2005 | Dayan et al. ................... 711/112 |
| 2006/0179163 | A1* | 8/2006 | Muramatsu ........... G06F 3/0605 710/1 |
| 2007/0050719 | A1 | 3/2007 | Lui et al. |
| 2010/0287551 | A1* | 11/2010 | Miller .......................... 718/100 |
| 2010/0332585 | A1* | 12/2010 | Driesen ......................... 709/203 |

(Continued)

OTHER PUBLICATIONS

Finding Iteration Patterns in Dynamic Web Page Authoring; Macias, J. and Catells, P.; E.P.S. Universidad Autonoma de Madrid; Engineering Human Computer Interaction and Interactive Systems, vol. 3425/2005, pp. 164-178.

(Continued)

*Primary Examiner* — Phil Nguyen
(74) *Attorney, Agent, or Firm* — Griffiths & Seaton PLLC

(57) ABSTRACT

Computer systems and computer program products for automating tasks in a computing environment are provided. In one such embodiment, by way of example only, if an instant task is not found in one of list of included tasks and a list of excluded tasks, at least one of the following is performed: the instant task is compared the with previous instances of the task, if any; the instant task is analyzed, including an input/output (I/O) sequence for the instant task, to determine if the instant task is similar to an existing task; and the instant task is considered as a possible candidate for automation. If the instant task is determined to be an automation candidate, the instant task is added to the list of included tasks, otherwise the instant task is added to the list of excluded tasks.

10 Claims, 5 Drawing Sheets

(56) References Cited

U.S. PATENT DOCUMENTS

2011/0154355 A1* 6/2011 Becker et al. ............... 718/104
2011/0276720 A1* 11/2011 Ickman et al. ............... 709/245
2011/0301996 A1* 12/2011 Johnson et al. ............. 705/7.26
2012/0005644 A1* 1/2012 Limburn et al. ............. 717/104

OTHER PUBLICATIONS

Learn Sesame—a Learning Agent Engine; Alper Caglayan et al., Applied Artificial Intelligence, 1997, vol. 11, pp. 393-412, Taylor and Francis, Publisher.

* cited by examiner

1) CQUERY FIRST DEVICE

INPUT:
CQUERY DEVN( F40 )
            402

OUTPUT:
```
*************** PPRC REMOTE COPY CQUERY - VOLUME *******************
*                                       (PRIMARY)     (SECONDARY) *
*                                       SSID CCA LSS  SSID CCA LSS*
*DEVICE    LEVEL      STATE     PATH STATUS  SERIAL#       SERIAL#      *
*------    ---------  ---------- -----------  ---------     ---------    *
* 0 F40    ........   SIMPLEX... INACTIVE    E200 06 06    ..........    *
* SCH(0)   ...........            ..........  000000000821 ............ *
*          ...........            ..........        404                  *
* PATHS SAID DEST STATUS: DESCRIPTION                                    *
* ----- ---------- ------ -------------------                            *
*   0   ---- ----    00   NO PATH............                            *
*       ---- ----    00   NO PATH............                            *
*       ---- ----    00   NO PATH............                            *
*       ---- ----    00   NO PATH............                            *
*  SUBSYSTEM         WWNN                  LIC LEVEL                     *
*  ----------        ----------------      ----------                    *
* PRIMARY....   5005076303FFC039           5.4.21.620                    *
* SECONDARY.1   5005076303FFC02C                                         *
*************************************************************************
```

2) CQUERY SECOND DEVICE

INPUT:
CQUERY DEVN(F50)

OUTPUT:
```
*************** PPRC REMOTE COPY CQUERY - VOLUME *******************
*                                       (PRIMARY)     (SECONDARY) *
*                                       SSID CCA LSS  SSID CCA LSS*
*DEVICE    LEVEL      STATE     PATH STATUS  SERIAL#       SERIAL#      *
*------    ---------  ---------- -----------  ---------     ---------    *
* 0F50     ........   SIMPLEX... INACTIVE    EA00 06 06    ..........    *
* SCH(0)   ...........            ..........  000000000822 ............ *
*          ...........            ..........    408   406                *
* PATHS SAID DEST STATUS: DESCRIPTION                                    *
* ----- ---------- ------ -------------------                            *
*   0   ---- ----    00   NO PATH............                            *
*       ---- ----    00   NO PATH............                            *
*       ---- ----    00   NO PATH............                            *
*       ---- ----    00   NO PATH............                            *
*  SUBSYSTEM         WWNN                  LIC LEVEL                     *
*  ----------        ----------------      ----------                    *
* PRIMARY....   5005076303FFC839           5.4.21.620                    *
*************************************************************************
                                410
```

3) CESTPATH

INPUT:
CESTPATH DEVN(x' F40 ')  PRIM(x' E200 ' 5005076303FFC039 x' 06 ')
    SEC(x' EA00 ' 5005076303FFC839 x' 06 ')  LINK(x'00000301')
                          410

4) CESTPAIR

INPUT:
CESTPAIR Devn(x' F40 ')  prim(x' E200 ' 000000000821 x'06' x'06')
    sec(x' EA00 ' 000000000822 x'06' x'06')  ONLINSEC(YES)
              408    406

FIG. 4

1) CQUERY FIRST DEVICE

INPUT:
CQUERY DEVN( F41 )    ← 502

OUTPUT:
```
*************** PPRC REMOTE COPY CQUERY - VOLUME ********************
*                                        (PRIMARY)    (SECONDARY) *
*                                        SSID CCA LSS SSID CCA LSS*
*DEVICE   LEVEL      STATE     PATH STATUS  SERIAL#      SERIAL#     *
*------   ---------  ----------  -----------  ----------  ----------  *
* 0F41    .........  SIMPLEX... INACTIVE   E200 07 06   ..........  *
* SCH(0)  .........              ..........  000000000821 ..........  *
*         .........              ..........              ↖504        *
* PATHS SAID DEST STATUS: DESCRIPTION                                 *
* -----  ---- ---- ------  -------------------                        *
*   0    ---- ----  00    NO PATH............                         *
*        ---- ----  00    NO PATH............                         *
*        ---- ----  00    NO PATH............                         *
*        ---- ----  00    NO PATH............                         *
*  SUBSYSTEM       WWNN                  LIC LEVEL                    *
*  ----------    ----------------        ---------                    *
* PRIMARY....    5005076303FFC039        5.4.21.620                   *
* SECONDARY.1    5005076303FFC02C                                     *
**********************************************************************
```

2) CQUERY SECOND DEVICE

INPUT:
CQUERY DEVN(F50)

OUTPUT:
```
*************** PPRC REMOTE COPY CQUERY - VOLUME ********************
*                                        (PRIMARY)    (SECONDARY) *
*                                        SSID CCA LSS SSID CCA LSS*
*DEVICE   LEVEL      STATE     PATH STATUS  SERIAL#      SERIAL#     *
*------   ---------  ----------  -----------  ----------  ----------  *
* 0F51    .........  SIMPLEX... INACTIVE   EA00 07 06   ..........  *
* SCH(0)  .........              ..........  000000000822 ..........  *
*         .........              ..........       ↖508   ↖506        *
* PATHS SAID DEST STATUS: DESCRIPTION                                 *
* -----  ---- ---- ------  -------------------                        *
*   0    ---- ----  00    NO PATH............                         *
*        ---- ----  00    NO PATH............                         *
*        ---- ----  00    NO PATH............                         *
*        ---- ----  00    NO PATH............                         *
*  SUBSYSTEM       WWNN           ↗510   LIC LEVEL                    *
*  ----------    ----------------        ---------                    *
* PRIMARY....    5005076303FFC839        5.4.21.620                   *
**********************************************************************
```

3) CESTPATH

INPUT:
CESTPATH DEVN(x' F41 ')  PRIM(x' E200 '  5005076303FFC039  x' 06 ')
        SEC(x' EA00 '  5005076303FFC839  x' 06 ')  LINK(x'00000301')
                              ↖510

4) CESTPAIR

INPUT:        502          508           504
CESTPAIR Devn(x' F41 ')  prim(x' E200  000000000821  x'07'  x' 06 ')
        sec(x' EA00 '  000000000822  x'07'  x' 06 ')  ONLINSEC(YES)
                             ↖506 example : Exclude when output indicates anything other than INACTIVE is shown:

```
*************** PPRC REMOTE COPY CQUERY - VOLUME ********************
*                                        (PRIMARY)    (SECONDARY) *
*                                        SSID CCA LSS SSID CCA LSS*
*DEVICE   LEVEL      STATE     PATH STATUS  SERIAL#      SERIAL#     *
*------   ---------  ----------  -----------  ----------  ----------  *
* 0F40    PRIMARY..  DUPLEX....  ACTIVE..   E200 06 06   EA00 06 06 *
* SCH(0)  CRIT(NO)..              CGRPLE(NO). 000000000821 000000000822*
*         INCRES(NO).             AUTORESYNC(NO).                     *
* PATHS PFCA SFCA STATUS: DESCRIPTION                                 *
* -----  ---- ---- ------  -------------------                        *
*   1    0000 0301  13    PATH ESTABLISHED...                         *
*        ---- ----  00    NO PATH............                         *
*        ---- ----  00    NO PATH............                         *
*        ---- ----  00    NO PATH............                         *
*  SUBSYSTEM       WWNN                  LIC LEVEL                    *
*  ----------    ----------------        ---------                    *
* PRIMARY....    5005076303FFC039        5.4.21.620                   *
* SECONDARY.1    5005076303FFC02C                                     *
* SECONDARY.2    5005076303FFC839                                     *
**********************************************************************
```

FIG. 5

INTELLIGENT INCLUSION/EXCLUSION AUTOMATION

BACKGROUND OF THE INVENTION

1. Field of the Invention

The present invention relates in general to computers, and more particularly to computer systems, and computer program products for intelligently automating tasks in a computing environment.

2. Description of the Related Art

People today often use automation to assist in making common tasks simpler. Automation refers to the use of control systems and information technologies to reduce the need for human work in the production of goods and services. In computing environments, automated functionality has found its way into virtually every segment. Computing/processor-based automation is used to increase productivity in industries such as manufacturing, transportation, and consumer (e.g., home automation and entertainment).

SUMMARY OF THE DESCRIBED EMBODIMENTS

Automation in the traditional sense generally requires manual setup. Typically, automation does not provide intelligence to determine what tasks should be automated, how it should be automated, and what should not be automated. Many tasks carried out by system programmers, storage administrators, and testers, for example, follow common steps or procedures that can and should be automated. Often times, however, such automation requires a great deal of time and investment. Accordingly, a need exists for an intelligent methodology that intelligently automates tasks by addressing the potential shortcomings discussed above.

To address these potential shortcomings, various methods, computer systems, and computer program products for automating tasks in a computing environment, are provided. In one such embodiment, by way of example only, if an instant task is not found in one of list of included tasks and a list of excluded tasks, at least one of the following is performed: the instant task is compared the with previous instances of the task, if any; the instant task is analyzed, including an input/output (I/O) sequence for the instant task, to determine if the instant task is similar to an existing task; and the instant task is considered as a possible candidate for automation. If the instant task is determined to be an automation candidate, the instant task is added to the list of included tasks, otherwise the instant task is added to the list of excluded tasks. Other related embodiments are disclosed and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 4 depicts an exemplary sequence of input and output I/O having been processed by automation functionality, again in which aspects of the present invention are implemented; and FIG. 5 depicts an additional exemplary sequence of I/O, again in which aspects of the present invention are implemented.

DETAILED DESCRIPTION OF THE DRAWINGS

Figure 1:
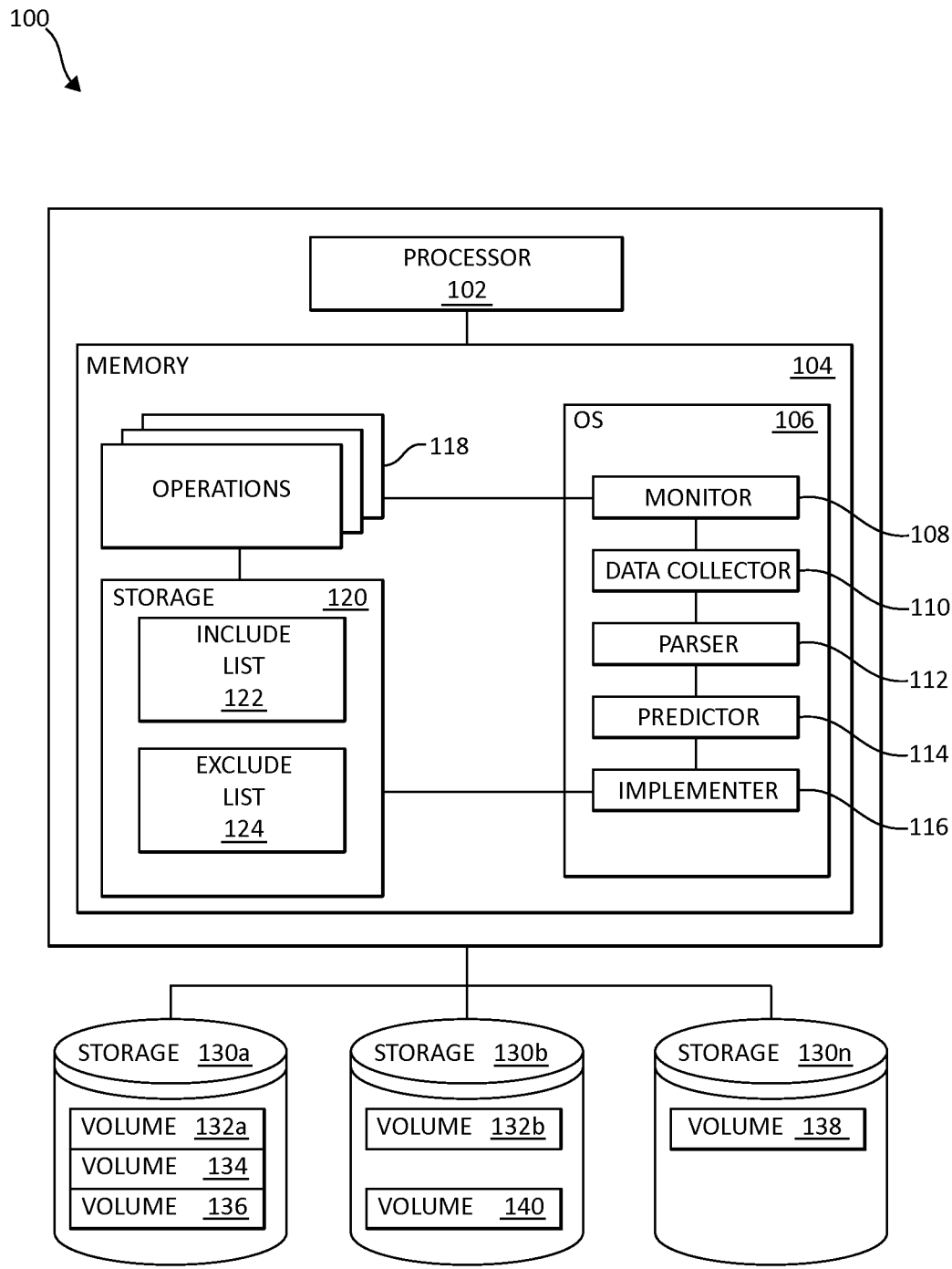
FIG. 1 is a block diagram of an exemplary computing environment in which aspects of the present invention may be implemented.

The illustrated embodiments provide an intelligent methodology for automating tasks by collecting information relating to what a user does during their normal work operations. This sequence of events is collected, the underlying data is parsed, and analyzed. The mechanisms of the illustrated embodiments look for patterns of events that lead to the same future action. When these patterns are recognized, the action which takes place as normally the next event is designated as a next event.

The mechanisms of the illustrated embodiment then monitor for similar events, and query the user to determine if the user wishes for these mechanisms to issue the expected action to take place after such a triggering event. In those cases where the user wishes to have the next event automated, the mechanisms automate that action in the future, based on a specific triggering event. For those items the user does not want automated, an exclusion list is built.

The exclusion list is then subsequently used to avoid automating similar tasks in the future. In one embodiment, those tasks chosen not to automate may share a similar jobname, application type, triggering event type, and other categorical items. This allows for automation only for those tasks the user considers to be ordinary or desirable. The ability to learn what to automate and what not to automate distinguishes one aspect of the illustrated embodiments over current automation products requiring the user to manually automate such processes.

In one embodiment, the mechanisms of the illustrated embodiments include several parts: monitor, data collector, analyzer/parser, predictor, and action implementer. The monitor may be tasked with keeping track of operations performed. Following each operation, the monitor passes the data into the data collector for analysis and parsing. The data collector may, in one embodiment, store information based on applications or commands issued on the system. Each portion may be broken down, for example, into a particular command, its input/output (I/O), and any commands subsequently issued. When tasks are executed in the future, the analyzer and parser may be used to compare the new data to data previously stored.

Again, in one embodiment, the analyzer/parser may be issued after data is collected for each new command being issued. The analyzer/parser may, for example, examine recent commands, and compare those to previous instances of the command, and parse its I/O for commonalties and differences. It will store this information via the data collector for the predictor to use on future commands for possible automation.

Again, in one embodiment, the predictor may be activated by the monitor when a command is issued. The predictor may check the data collector for additional occurrences of the command. When the predictor locates a pattern based on previous occurrences of commands/applications, the predictor informs the user of a possible sequence to automate. Should the user agree to the process being automated, it will be flagged for automation in the future. Otherwise, it will be stored in the exclude list.

As previously indicated, the exclude list includes actions the user does not wish to be automated, allowing the mechanisms of the illustrated embodiments to make precise automation decisions in the future. Finally, the action implementer may, in one embodiment, perform tasks flagged to be automated by the predictor. The implementer may, for example, take the information gained by previous executions of a command/sequence of commands to complete additional tasks that are common to the user. Together, all of the aforementioned parts allow for a common activity to be intelligently automated.

FIG. 1 illustrates an exemplary computing environment in which aspects of the present invention, including the functional blocks (which may be referred to herein as "modules") described above, may be implemented. It should be appreciated, however, that FIG. 1 is only exemplary and is not intended to state or imply any limitation as to the particular architectures in which the exemplary aspects of the various embodiments may be implemented. Many modifications to the architecture depicted in FIG. 1 may be made without departing from the scope and spirit of the following description and claimed subject matter.

The environment 100 includes a processor 102 and a memory 104, such as random access memory (RAM). In the illustrated embodiment, the environment 100 operates under control of an operating system (OS) 106 (e.g. z/OS, OS/2, LINUX, UNIX, WINDOWS, MAC OS) stored in memory 104, and interfaces with the user to accept inputs and commands and to present results. As one of ordinary skill in the art wil appreciate, various application programs written in a programming language such as COBOL, PL/1, C, C++, JAVA, ADA, BASIC, VISUAL BASIC or any other programming language may be translated into code that is readable and operable by the processor 102.

To further implement and execute mechanisms and processes according to the present invention, OS 106, in conjunction with the memory 104, the processor 102, and other computer processing, networking, and storage components, may implement such functional modules previously described as the monitor 108 (shown in communication with operations 118 for monitoring operations 118), data collector 110, parser 112, predictor 114, and implementer 116 as shown. As further shown, within storage 120, an include list 122 and an exclude list 124 are maintained. The interaction of components 108, 110, 112, 114, 116, 118, 122, and 124 will be further described in more detail.

In one embodiment, instructions implementing the operating system 106, the monitor 108, the data collector 110, the parser 112, the predictor 114, and the implementer 116, as well as the include and exclude lists 122, 124 are tangibly embodied in a computer-readable medium, which may include one or more fixed or removable data storage devices, such as a zip drive, disk, hard drive, DVD/CD-ROM, digital tape, SSDs, etc. Further, the operating system 106 comprises instructions (e.g., in executable portions) which, when read and executed by the environment 100, cause the environment 100 to perform the steps necessary to implement and/or use the present invention. The operating system 106 instructions may also be tangibly embodied in the memory 104 and/or transmitted through or accessed by network (e.g., Ethernet, etc.) via various components that are not shown for purposes of simplicity. As such, the terms "article of manufacture," "program storage device" and "computer program product" as may be used herein are intended to encompass a computer program accessible and/or operable from any computer readable device or media.

In the depicted embodiment, storage 130 (includes all storage components shown in the figure as 130A, 130B, and 130n) may be physically comprised of one or more storage devices, such as storage arrays. A storage array is a logical grouping of individual storage devices, such as a hard disk. In certain embodiments, storage 130 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

As shown in FIG. 1, a logical volume, or simply "volume," may have different kinds of allocations. Storage 130A is shown configured with two entire volumes, 134 and 136 and a partial volume 132A. Storage 130B is shown with another partial volume 132b and an entire volume 140. Storage 130n is shown as being fully allocated to volume 138. From the above examples, it will be appreciated that the storage 130 may be configured to include one or more partial and/or entire volumes. Volumes may further be divided into so-called "tracks," which represent a fixed block of storage. A track is therefore associated with a given volume.

Figure 2:
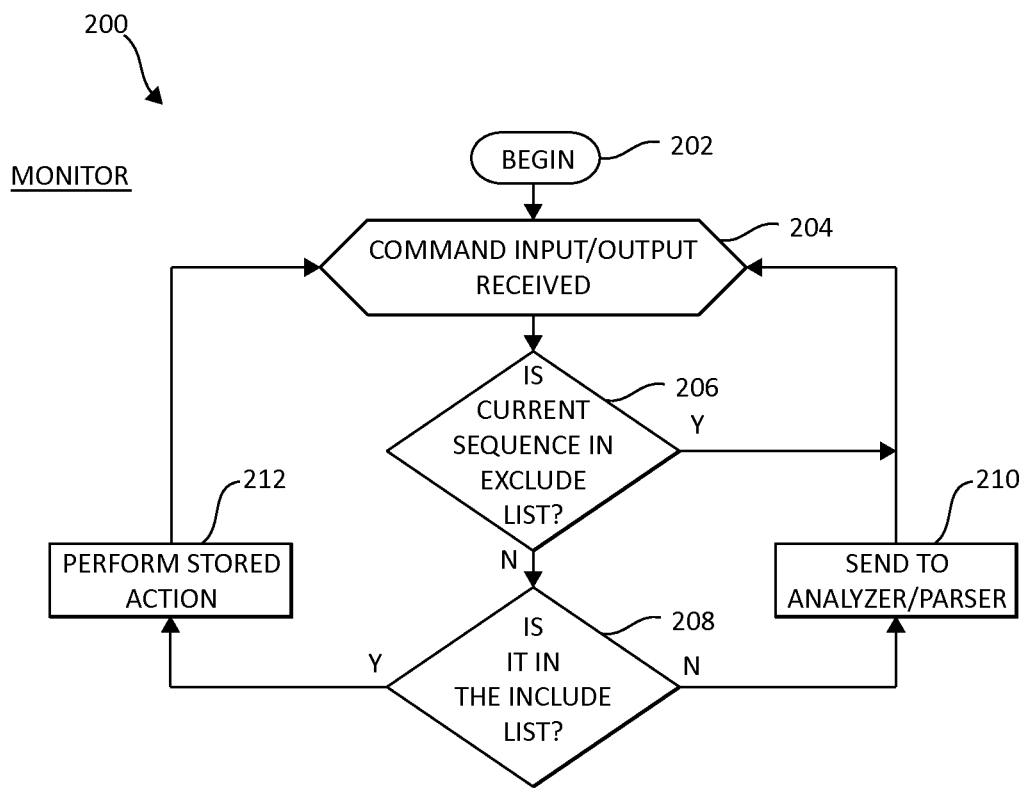
FIG. 2 is a flow diagram illustrating an exemplary monitoring process, again in which aspects of the present invention may be implemented.

Turning now to FIG. 2, an exemplary method for intelligent automation in computing environments is shown, as from the perspective of the monitor 108 (again, FIG. 1). Accordingly, method 200 illustrates an exemplary methodology for monitoring and processing data in which aspects of the present invention are incorporated. It will be appreciated by one of ordinary skill in the art that, while FIGS. 2-5, following, relate to I/O commands in particular, the methodologies of the illustrated embodiments are applicable to other tasks/jobs/operations that may be automated in similar fashion. Returning to the instant example, method 200 begins (step 202) by the receipt of a command I/O (step 204). The method 200 then queries if the current sequence of one or more commands is located in either the exclude list (step 206), or the include list (step 208). If the sequence is in the exclude list, the command is ignored and the method returns to step 204. If the current sequence is not in the exclude list, but is in the include list, then the stored action is performed (step 212). Alternatively, if the current sequence is not found in either the exclude nor the include lists, the sequence is sent to the analyzer/parser for further analysis (step 210).

Figure 3:
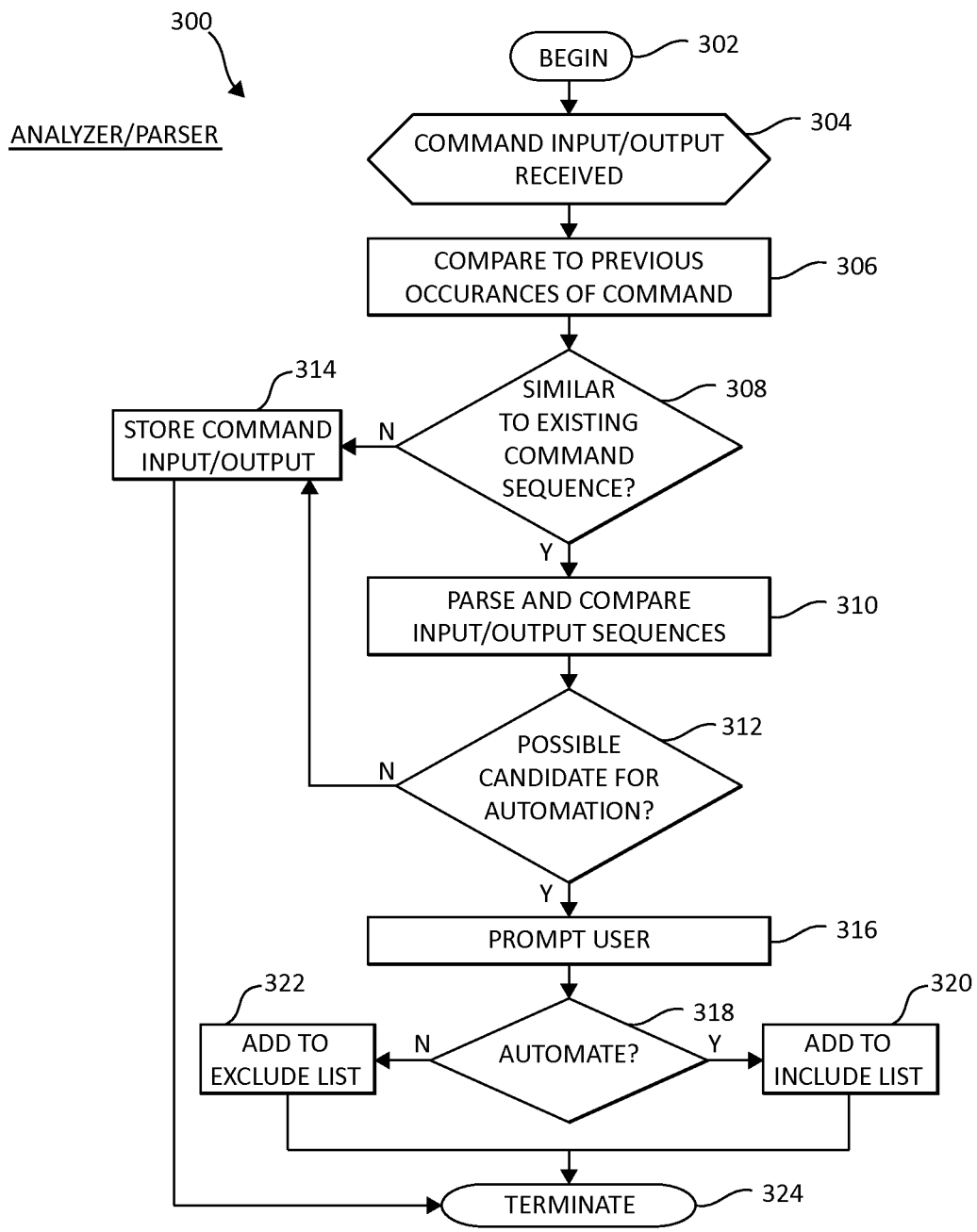
FIG. 3 is a flow diagram illustrating an exemplary analysis/parsing process, again in which aspects of the present invention may be implemented.

FIG. 3, following shows an additional exemplary method for intelligent automation, here from the perspective of the analyzer parser 112 (again, FIG. 1), following its receipt of the command sequence from the monitor 108 as shown in FIG. 2, previously. Method 300 begins (step 302) with receipt of the command I/O from the monitor (step 304). The I/O is compared to previous occurrences of the command(s) (step 306). If the I/O is similar to an existing command or command sequence (step 308), the command(s) are parsed and I/O sequences associated with the command(s) are compared (step 310).

In step 312, the method 300 queries whether the command(s) are a possible candidate for automation (step 312). If no, the command and corresponding I/O are stored (step 314), and the method 300 ends (step 324). Alternatively, if the method 300 determines that the command(s) are possible automation candidates, the user is prompted (step 316)

to confirm. If the user does confirm (step 318), then the command(s) are added to the include list (step 320). Otherwise, the command(s) are added to the exclude list (step 322) as shown. The method 300 then ends (again, step 324).

In view of the foregoing, consider the following example performed on the z/OS® platform distributed by International Business Machines Corporation (IBM®). A common task performed on such platform is the submittal of a Job Control Language (JCL) job. Typically, when a such a job is submitted, all the information pertaining to that job, along with additional output detail is stored in a JOBLOG, which can be viewed on the system. It is common after submitting a job for the user to immediately open the JOBLOG and view the job's output. The mechanisms of the illustrated embodiments would recognize that commonly after submitting a job, a browse is issued on the associated JOBLOG (i.e., when "SUBMIT" is issued, "BROWSE" command commonly follows on the associated JOBLOG), and (with the user's confirmation) may automate this in the future, such that each time a user issues a SUBMIT X, where X is an arbitrary job, a BROWSE X from System Display and Search Facility (SDSF) is automatically issued, and the user is immediately brought to the JOBLOG.

Taking the forgoing example further, the mechanisms may learn that in some sequences, a particular JOBLOG may receive a corresponding non-zero return code, or another particular JOBLOG may receive a zero return code. The mechanisms may determine that those JOBLOGs having a non-zero return code are candidates for automation, while those JOBLOGs receiving a zero return code may be added as a rule to the exclude list. In this manner, based on a user's response on which items to automate, in one environment all JOBLOGs may be displayed, and alternatively, in another environment, only JOBLOGs having a non-zero return code are displayed (i.e., those JOBLOGS having a zero return code are excluded per the exclude list).

Consider the following additional example, involving Peer-to-Peer Remote Copy (PPRC) implementations. Before establishing PPRC PATHS and PPRC PAIRS, a client typically issues a pair of CQUERY commands on the devices they wish to involve in the PPRC setup. The CQUERY output is used to insert information into the successive CESTPATH and CESTPAIR commands. Here again, the mechanisms of the illustrated embodiments would recognize the relationship between fields in the output of the CQUERY commands and the input in the subsequent CESTPATH/CESTPAIR commands following the CQUERY commands if the output of the CQUERY indicates that the devices are already in ACTIVE pairs. The user could exclude the automation for times when the output indicates ACTIVE on the CQUERY commands.

FIG. 4 illustrates the methodology of data analysis performed by the analyzer/parser 112 and previously depicted in FIG. 3 as shown in an exemplary sequence of commands 400. Here a CQUERY is issued for a first device and returns the output shown. The Device Number (DEVN) as highlighted by boxes 402 is common to the input and output strings as shown, and may be recognized by the mechanisms of the illustrated embodiments. In addition, the serial number of the device (highlighted by box 404 in the output string) will be used in the later CESTPAIR command as shown.

As is also shown, a CQUERY command is issued for the second device. Here, the output string includes again the serial number for the second device (highlighted by box 408), as well as the CCA (shown by box 406) and the World Wide Node Name (WWNN) address shown by box 410. As is seen following, each of the boxes 402, 404, 406, 408, and 410 are found in multiple occurrences throughout the sequence of input and output streams (including the input strings required for the subsequent CESTPATH and CESTPAIR commands as shown). Such fields may be recognized by the mechanisms of the illustrated embodiments by comparing multiple occurrences of these sequence of commands and their outputs. This pattern then may be used to automate and/or auto-populate the fields for the user, for example.

Once such patterns are recognized after comparing the input and output of multiple occurrences of this sequence, then in a subsequent sequence 500 shown by FIG. 5, following (including the commonly used fields highlighted by boxes 502, 504, 506, 508, and 510, again referring to such characteristics as the DEVN, serial number, CCA, WWNN, etc.), the mechanisms of the illustrated embodiments may prompt the user if he would like the present sequence to be filled automatically the next time the system recognizes the start of the sequence. In this case, the trigger event is the occurrence of two successive CQUERY commands.

In similar fashion, since the mechanisms of the illustrated embodiments may process strings, they may recognize fundamental difference in outputs, allowing the user to have the process not automated should the output be different. For example, if the output from either CQUERY indicates the devices are already in an active relationship, the user may indicate that he does not want the remainder of the sequences activated. Such a situation would be evident to the mechanisms of the illustrated embodiments via the presence of the particular condition in the exclude list. The depicted output string at the bottom of FIG. 5 illustrates such an example following from the identification of two inactive devices as shown above, resulting in a path and a PPRC pair being established.

As one of ordinary skill in the art will appreciate, the foregoing examples illustrate two of the possibilities of various implementations of the present invention. Various mechanisms of the present invention, such as recognition of patterns, establishment of include/exclude functionality, and the like may be used in a variety of settings to provide intelligent automation functionality.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for automating tasks in a computing environment, comprising:
    a processor, operable in the computing environment, wherein the processor is adapted for:
    if an instant task is not found in one of list of included tasks and a list of excluded tasks, performing:
    comparing the instant task with previous instances of the task, if any,
    analyzing the instant task, including at least part of an input/output (I/O) sequence for the instant task to determine if the instant task is similar to an existing task, and
    considering the instant task as a possible candidate for automation; wherein if the instant task is determined to be an automation candidate, the instant task is added to the list of included tasks, otherwise the instant task is added to the list of excluded tasks, and
    in conjunction with the comparing, analyzing, and considering, weighing at least one additional event to be added to the instant task as a sequence of automated tasks
    prompting a user to confirm of at least one of the instant task and the sequence as the automation candidate.

2. The system of claim 1, wherein the processor is further adapted for, pursuant to analyzing the instant task to determine if the instant task is similar to the existing task includes determining if the instant and the existing tasks have at least one of a similar jobname, application type, and triggering event type.

3. The system of claim 1, wherein the processor is further adapted for obtaining a confirmation from the user for automating the at least one of the instant task and the sequence, wherein the confirmation from the user is considered in subsequent analysis for a subsequent task.

4. The system of claim 1, wherein the processor is further adapted for, if one of: the instant task is determined not to be similar to the existing task, and the instant task is determined not to be an automation candidate, storing at least a portion of the instant task for subsequent analysis for a subsequent task.

5. The system of claim 1, wherein the processor is further adapted for, pursuant to storing at least a portion of the instant task for subsequent analysis, storing an input/output characteristic of the instant task.

6. A computer program product for automating tasks by a processor in a computing environment, the computer program product comprising a non-transitory computer-readable storage medium having computer-readable program code portions stored therein, the computer-readable program code portions comprising: a first executable portion for:
    if an instant task is not found in one of list of included tasks and a list of excluded tasks, performing:
    comparing the instant task with previous instances of the task, if any, analyzing the instant task, including at least part of an input/output (I/O) sequence for the instant task to determine if the instant task is similar to an existing task, and considering the instant task as a possible candidate for automation; wherein if the instant task is determined to be an automation candidate, the instant task is added to the list of included tasks, otherwise the instant task is added to the list of excluded tasks; and in conjunction with the comparing, analyzing, and considering, weighing at least one additional event to be added to the instant task as a sequence of automated tasks prompting a user to confirm of at least one of the instant task and the sequence as the automation candidate.

7. The computer program product of claim 6, further including a second executable portion for, pursuant to analyzing the instant task to determine if the instant task is similar to the existing task, determining if the instant and the existing tasks have at least one of a similar job name, application type, and triggering event type.

8. The computer program product of claim 6, further including a fourth executable portion for obtaining a confirmation from the user for automating the at least one of the instant task and the sequence, wherein the confirmation from the user is considered in subsequent analysis for a subsequent task.

9. The computer program product of claim 6, further including a second executable portion for, if one of:

the instant task is determined not to be similar to the existing task, and the instant task is determined not to be an automation candidate, storing at least a portion of the instant task for subsequent analysis for a subsequent task.

10. The computer program product of claim 6, further including a fourth executable portion for, pursuant to storing at least a portion of the instant task for subsequent analysis, storing an input/output characteristic of the instant task.

* * * * *